US012060211B2

(12) United States Patent
Thomas

(10) Patent No.: US 12,060,211 B2
(45) Date of Patent: Aug. 13, 2024

(54) BOUND PAD OF EXPANDABLE SLIT-SHEET STOCK MATERIAL

(71) Applicant: Ranpak Corp., Concord Township, OH (US)

(72) Inventor: Lawrence B. Thomas, Tampa, FL (US)

(73) Assignee: Ranpak Corp., Concord Township, OH (US)

( * ) Notice: Subject to any disclaimer, the term of this patent is extended or adjusted under 35 U.S.C. 154(b) by 372 days.

(21) Appl. No.: 17/431,627

(22) PCT Filed: Feb. 18, 2020

(86) PCT No.: PCT/US2020/018542

§ 371 (c)(1),
(2) Date: Aug. 17, 2021

(87) PCT Pub. No.: WO2020/172109

PCT Pub. Date: Aug. 27, 2020

(65) Prior Publication Data

US 2022/0033163 A1 Feb. 3, 2022

Related U.S. Application Data

(60) Provisional application No. 62/807,595, filed on Feb. 19, 2019.

(51) Int. Cl.
*B65D 81/127* (2006.01)
*B31D 5/00* (2017.01)
(Continued)

(52) U.S. Cl.
CPC ......... *B65D 81/127* (2013.01); *B31D 5/0065* (2013.01); *B65B 61/22* (2013.01);
(Continued)

(58) Field of Classification Search
CPC .... B65D 81/127; B65D 65/44; B65D 65/466; B31D 5/0065; B31D 2205/0017
See application file for complete search history.

(56) References Cited

U.S. PATENT DOCUMENTS 756,013 A * 3/1904 Franklin ................ B42D 5/005 206/39
1,153,503 A * 9/1915 Kuhmarker ............ B42D 5/005 225/41

(Continued)

FOREIGN PATENT DOCUMENTS

WO 96/24540 A1 8/1996
WO 2014/014905 A1 1/2014

OTHER PUBLICATIONS

International Search Report and Written Opinion dated May 27, 2020, for International Patent Application No. PCT/US2020/018542.

(Continued)

*Primary Examiner* — Lucas E. A. Palmer
(74) *Attorney, Agent, or Firm* — Renner, Otto, Boisselle & Sklar, LLP

(57) ABSTRACT

A bound pad presents a compact and convenient form of providing a two-ply construction that includes a slit-sheet stock material that may be positioned on or hung from a flat surface at the end-user's site. The bound pad includes sheets of slit-sheet stock material that are interleafed with non-die cut separator sheets. The sheets are bound together adjacent one edge, and may be weakened adjacent the bound edge to facilitate their removal from the bound pad during use. A user creates tension by pulling a free edge of the sheet of slit sheet material away from the bound edge, thereby expanding the slit material sheet to form an expanded packaging material. The user places an article on the bound pad, wraps
(Continued)

the article in the sheets, and tears the sheets to remove the wrapped article from the bound pad.

11 Claims, 6 Drawing Sheets

(51) Int. Cl.
*B65B 61/22* (2006.01)
*B65D 65/46* (2006.01)
*B65D 81/02* (2006.01)
(52) U.S. Cl.
CPC ........... *B65D 65/44* (2013.01); *B65D 65/466* (2013.01); *B31D 2205/0017* (2013.01); *B65D 2565/383* (2013.01); *B65D 2581/053* (2013.01)

(56) References Cited

U.S. PATENT DOCUMENTS 2,553,923 A * 5/1951 Lambert ................ B65D 65/02 229/87.02
2,840,962 A * 7/1958 Stremke .................. B65B 67/10 53/390
2,848,104 A * 8/1958 Schor ................... B65H 16/005 211/44
3,288,353 A * 11/1966 Mccullough ......... B65D 65/403 229/87.02
3,302,781 A * 2/1967 Rudnick ................ B65D 85/67 242/588.4
3,550,842 A * 12/1970 Scholz ................... B65D 29/04 229/87.08
3,778,324 A * 12/1973 Lavigne ................. B42D 5/001 283/2
3,793,799 A * 2/1974 Howe ..................... B65B 67/08 206/451
4,590,109 A * 5/1986 Holmberg .............. B42D 5/003 156/247
5,050,909 A * 9/1991 Mertens .................... B41L 1/24 283/117
5,299,833 A * 4/1994 Madole, Jr. ............ B42D 5/003 281/38
5,318,825 A * 6/1994 Naber .................... B42D 5/003 40/594
5,344,016 A * 9/1994 Weder ..................... B65B 25/02 229/87.01
5,448,875 A * 9/1995 Weder ................. B29C 61/0608 53/465
5,479,761 A * 1/1996 Weder .................... B31F 1/0045 53/461
5,538,778 A * 7/1996 Hurwitz ............... B31D 5/0065 428/338
5,661,955 A * 9/1997 Maida ..................... B65B 67/08 53/472
5,667,871 A * 9/1997 Goodrich .................. B31C 5/00 428/338
5,688,578 A * 11/1997 Goodrich .................. B31C 5/00 428/184
5,948,494 A * 9/1999 Levin ..................... B42D 5/003 462/900
6,088,997 A * 7/2000 Weder .................... A47G 7/085 53/399
6,151,869 A * 11/2000 Weder ...................... A01G 5/04 53/461
9,376,286 B1 * 6/2016 Browning .............. B65G 57/04
9,505,574 B2 * 11/2016 Kuchar ................ B65H 16/005
9,701,091 B2 * 7/2017 Page ...................... B65H 23/06
10,226,907 B2 * 3/2019 Goodrich ................ B32B 3/266
10,227,195 B2 * 3/2019 Page ...................... B65H 23/08
10,513,391 B1 * 12/2019 Sosan ........................ B65F 1/16
10,850,891 B2 * 12/2020 Yan ........................ B65D 31/02
11,440,305 B2 * 9/2022 Goodrich .................. B32B 3/12
11,745,930 B2 * 9/2023 Goodrich ................. B31D 3/04 206/521
2006/0083886 A1 * 4/2006 Harrison ............... B32B 29/002 131/365
2011/0185682 A1 * 8/2011 Rockwell ............. B65D 81/127 53/472
2014/0027553 A1 * 1/2014 Page ...................... B65H 23/06 242/159
2015/0140265 A1 * 5/2015 Page .................... B31D 1/0075 493/379
2017/0313017 A1 * 11/2017 Cheich ................. B31D 5/0065
2018/0236742 A1 * 8/2018 Cheich ................. B31D 5/0065
2018/0281336 A1 * 10/2018 Cheich ................. B31D 5/0065
2021/0114791 A1 * 4/2021 Goodrich ............... B42D 5/002

OTHER PUBLICATIONS

International Preliminary Report on Patentability dated Aug. 10, 2020, for International Patent Application No. PCT/US2020/018542.

* cited by examiner

BOUND PAD OF EXPANDABLE SLIT-SHEET STOCK MATERIAL

This application is a national phase of International Application No. PCT/US2020/018542 filed Feb. 18, 2020, which claims priority to U.S. Provisional Application No. 62/807,595 filed Feb. 19, 2019, all of which are hereby incorporated herein by reference in their entireties.

FIELD OF THE INVENTION

The present invention is related to pre-slit expandable sheet stock material.

BACKGROUND

In the process of shipping one or more articles from one location to another, a packer typically places some type of dunnage material in a shipping container, such as a cardboard box, along with the article or articles to be shipped. The dunnage material typically is used to wrap the articles or to partially or completely fill the empty space or void volume around the articles in the container. By filling the void volume, the dunnage prevents or minimizes movement of the articles that might lead to damage during the shipment process. The dunnage also can perform a cushioning function. Some commonly used dunnage materials are plastic foam peanuts, plastic bubble pack, air bags, and converted paper dunnage material.

Expandable slit-sheet packing material, also referred to as slit-sheet material, slit-sheet stock material, die-cut sheet stock material, slit material, stock material, or sheet material, for example, is useful as a cushioning material for wrapping articles and as a void-fill material for packages. The term expanding, as used herein, refers to a three-dimensional expansion, or a volume expansion. The material expands in length and thickness while decreasing in width, to yield an increase in volume and comparable decrease in density. The slit-sheet material has multiple slits typically arranged in parallel, longitudinally-spaced rows that run across the sheet material. When the slit-sheet material is stretched in a longitudinal direction, which is transverse to the direction of the slits in the rows, the material deforms, increasing in length and thickness.

Exemplary slit-sheet packing materials, and the manufacturing thereof, are described in greater detail in U.S. Pat. Nos. 5,667,871 and 5,688,578, the disclosures of which are incorporated herein by reference in their entireties.

SUMMARY

Slit sheet stock material typically is supplied in the form of a roll or a fan-folded stack, along with a roll of a separator sheet material that keeps layers of expanded slit sheet stock material from nesting. The separator sheet material also may be referred to as an interleaf sheet material. Conventional forms of presenting the two-ply construction of slit-sheet stock material include manual and motorized expanding devices or a disposable, prefabricated box. Such devices and boxes must accommodate two types of sheet material and may contain tensioning devices, cutting surfaces, motors, and blades. As a result, many conventional devices and boxes are large, heavy, and inconvenient for use in many locations where space is limited, such as the cash register station at the point-of-sale in retail stores and other low-volume applications.

The present invention provides a compact and convenient form of presenting the two-ply construction of slit-sheet stock material interleaved with a separator sheet material in a flat pack that may be positioned on or hung from a flat surface (e.g., tabletop, drawer, easel, wall). As a result, a cushioning or void-fill dunnage product can be provided even where space is limited. Because the flat surface of the pack also can be used as a work surface, the useability of a countertop or other flat work surface may be substantially retained after the addition of the flat pack provided by the invention. Additionally, due to the arrangement of the flat pack, a user may easily grasp and expand the slit-sheet stock material, wrap an article in the separator sheet and expanded slit-sheet stock material, and then tear the slit-sheet stock material and separator sheet material to obtain a cushioned article. Additionally, the flat pack is easy to package for presentation in traditional shelf space at points of retail sale. It can be sold at an economically viable price in units with just a few sheets of packaging material as there is no need to recover the cost of an expanding device or box.

Accordingly, the present invention provides a bound pad or pack of packaging that includes a generally rectangular stack of a plurality of sheets of stock material. The sheets of stock material include a plurality of sheets of die-cut slit stock material, and each slit stock material sheet is separated from an adjacent slit stock material sheet by an interleafed non-die cut sheet. The die-cut slit material sheets and interleafed non-die cut sheet are bound together adjacent one edge. The sheet stock material, both die-cut and non-die cut, may be perforated or otherwise weakened along a transverse line adjacent the bound edge to facilitate removal of each sheet from the bound pad.

More particularly, the present invention provides a bound pad having a generally rectangular stack of a plurality of sheets of stock material, including a plurality of sheets of slit stock material. Each sheet of slit stock material is separated from an adjacent sheet of slit stock material by an interleafed non-die cut separator sheet. The sheets of slit stock material each include a plurality of slits configured to separate under tension applied in a direction across the length of the slits. The plurality of sheets of the slit stock material and the interleafed non-die cut separator sheets are bound together along one edge.

The plurality of slits may be arranged in a plurality of transversely-extending, longitudinally-spaced rows of slits. Each slit is longitudinally expandable.

At least one of the plurality of sheets of slit stock material and the interleafed non-die cut separator sheets may be recyclable, biodegradable, and composed of a renewable resource.

At least one of the plurality of sheets of slit stock material and interleafed non-die cut separator sheets may include paper.

The bound edge may be bound with an adhesive.

The bound pad may be configured for attachment to a structure to provide tension when a user pulls a sheet of slit stock material to cause the slit stock material to expand to form an expanded packaging material.

The bound pad may further include a tear strip adjacent the bound edge to facilitate removal of sheets from the stack.

The sheets of slit stock material and the interleafed non-die cut separator sheets may be perforated or otherwise weakened adjacent the bound edge to facilitate removal from the stack.

The present invention also provides a method of using the bound pad. The method includes the steps of (a) pulling an edge of a sheet of the plurality of sheets of slit stock material away from the bound edge, thereby expanding the slit stock material to form a sheet of expanded packaging material; (b) placing an item to be protected on the stack; (c) simultaneously wrapping the item within a sheet of expanded packaging material and a non-die cut separator sheet; and (c) tearing the sheet of expanded packaging material and the non-die cut separator sheet adjacent to the bound edge to remove the wrapped item from the bound pad.

The placing step (b) may include placing the item on the non-die cut separator sheet.

The foregoing and other features of the invention are fully described below and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
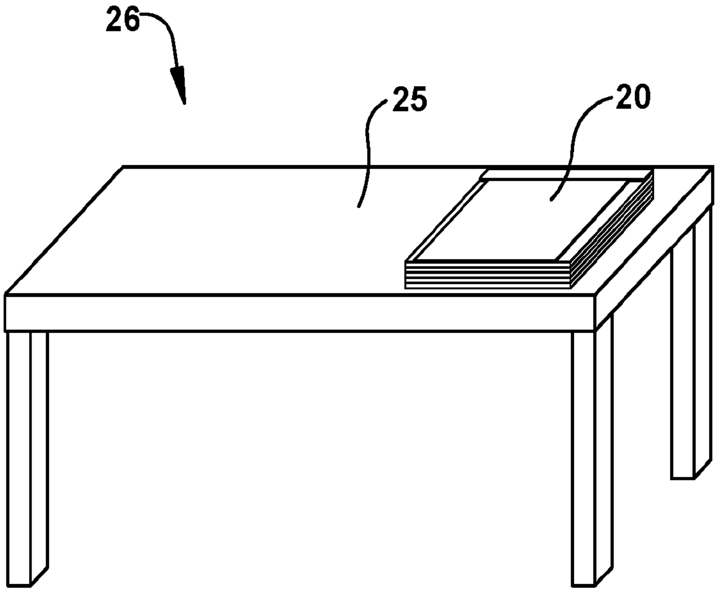
FIG. 1 is a perspective view of an exemplary bound pad of the present invention on a tabletop.
Figure 2:
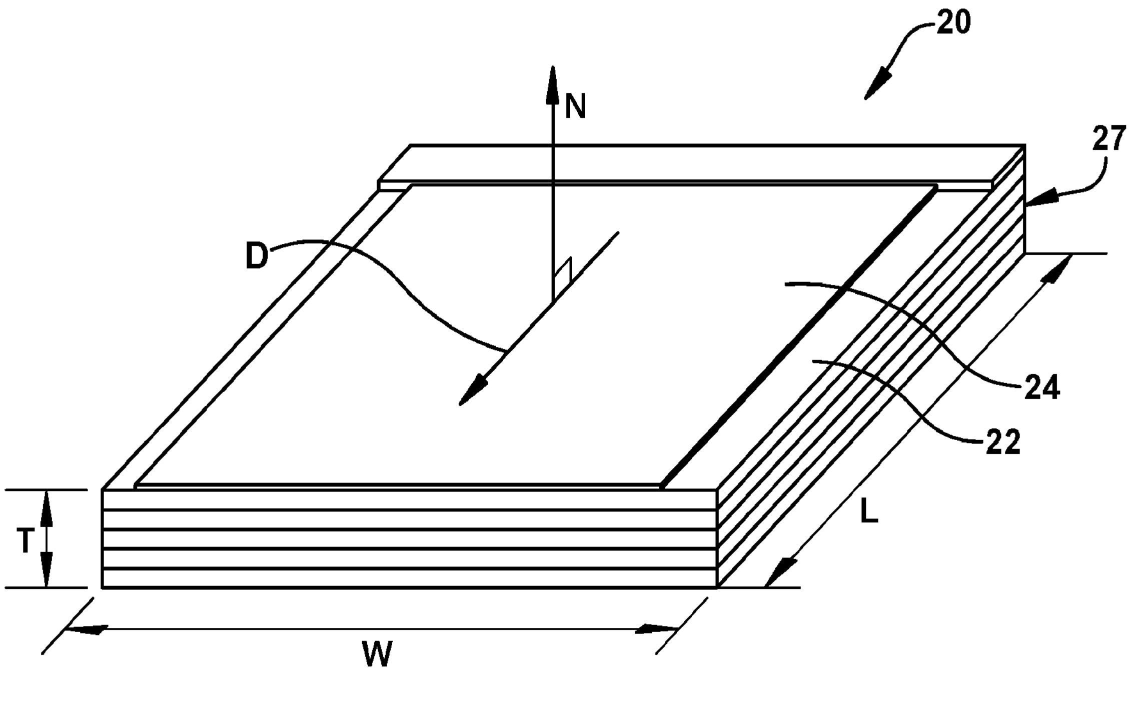
FIG. 2 is another perspective view of the bound pad of FIG. 1.

Referring now to the drawings in detail, and initially to FIGS. 1 and 2, the present invention provides a compact supply of sheet stock material ready for conversion into a packaging product in the form of a pack 20 of pre-cut slit sheet stock material 22 interleaved with non-cut separator sheets 24, all of which are bound together adjacent one edge. The pack also may be referred to as a bound pad 20. An exemplary bound pad 20 is shown supported by a table 25 or other generally-horizontal work surface at a packaging station 26. The bound pad 20 is substantially flat, and has a top surface generally parallel to the work surface of the table 25 or other support. The bound pad 20 may be secured to the work surface with friction strips, adhesive tape, mechanical fasteners such as nails or screws, by placing the pad so that one or more holes drilled through the pad near the bound edge fit over a corresponding number of similarly-spaced posts protruding from the work surface, for example, or other means for securing the pad to the table 25 sufficiently to permit sheets to be pulled from the bound pad 20 in the longitudinal direction D, away from the bound edge 27 of the pad 20 without pulling the bound pad 20 off the table.

The bound pad 20 is generally rectangular, with length L and width W dimensions that typically are much greater than the thickness T or height of the bound pad 20. The rectangular volume occupied by the bound pad 20 is very compact, and multiple bound pads can be efficiently stacked for transport, storage or in a display at the point of retail sale. Moreover, the flat top surface of the bound pad 20 may function as a work surface in addition to the bound pad 20 providing a supply of packaging material. The compactness and convenience of the bound pad 20 provided by the present invention allows it to be easily shipped and used in packaging stations 26 at many locations, such as the cash register station at the point-of-sale in retail stores. As mentioned above, the bound pad 20 is a generally rectangular stack of a plurality of sheets of stock material, including a plurality of sheets of die-cut slit sheet material 22 and non-die cut sheets 24 interleafed and separating adjacent sheets of slit sheet material 22.

Figure 3:
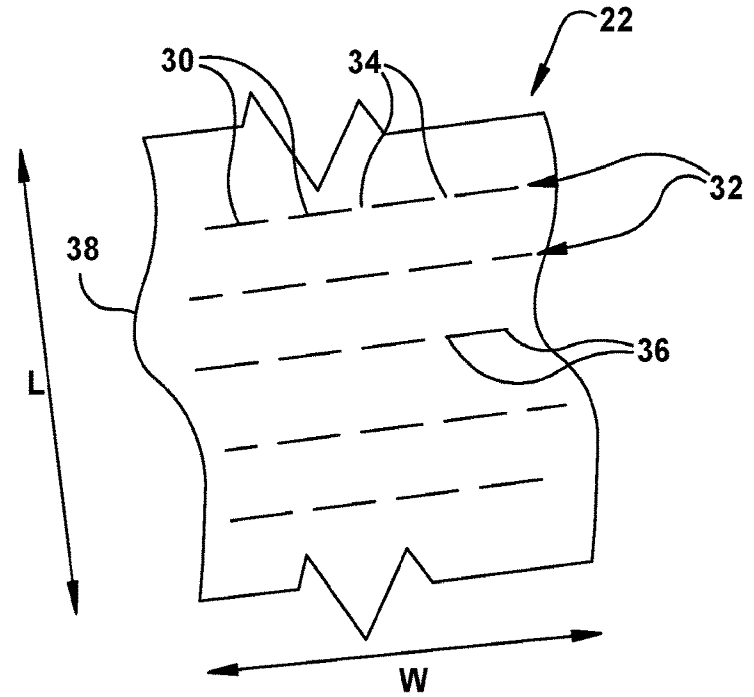
FIG. 3 is a partial schematic plan view of a slit-sheet stock material in accordance with the present invention.
Figure 4:
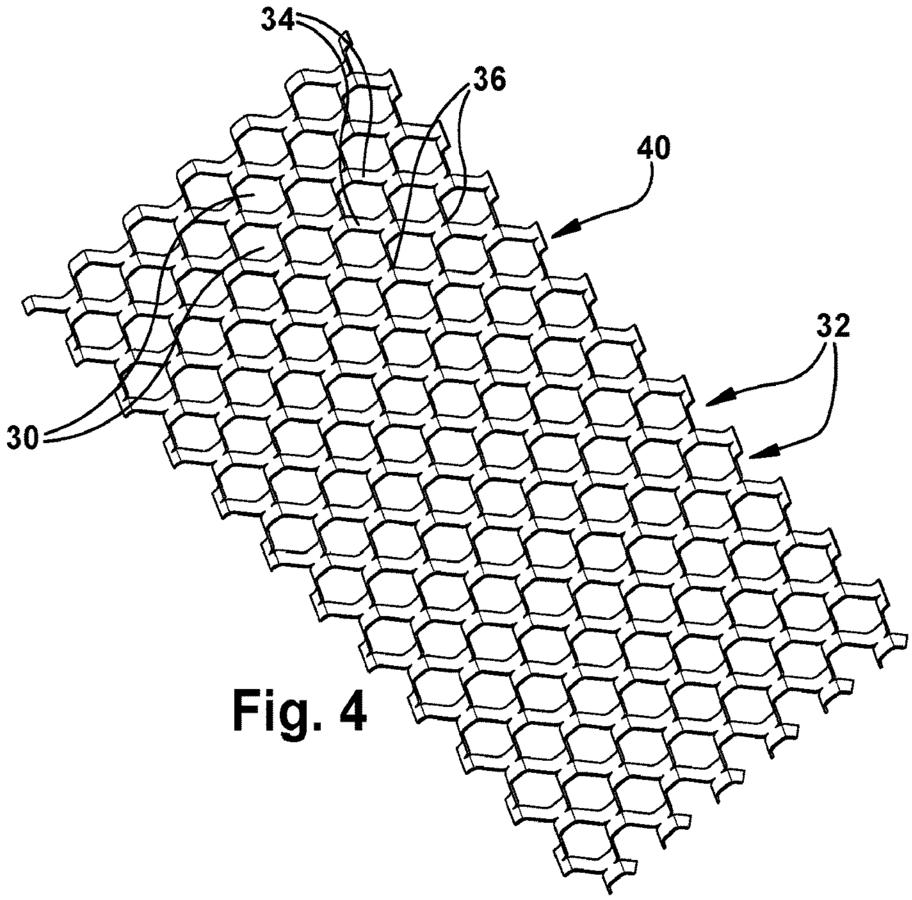
FIG. 4 is a partial perspective view of an expanded dunnage product formed from the slit-sheet stock material of FIG. 3.

Turning now to FIGS. 3 and 4, an exemplary sheet of slit stock material is depicted at 22. The slit-sheet stock material 22 may include paper, such as kraft paper, and typically includes single-ply kraft paper. A suitable kraft paper may have various basis weights, such as twenty-pound or forty-pound, for example. Paper is recyclable, biodegradable, and composed of a renewable resource. The paper itself may be made of zero to 100% recycled material. In some embodiments, the slit-sheet stock material 22 may be laminated or may include any other suitable material such as another paper, plastic sheets, metal foil, or any other combination thereof. In some embodiments, the slit-sheet stock material 22 may not include paper.

The slit-sheet stock material 22 has a plurality of slits 30 arranged in a plurality of longitudinally-spaced, transversely-extending rows 32 of slits 30 arranged across the width W of the slit-sheet stock material 22. The slit-sheet stock material 22 may have any of many alternative arrangements of slits 30 and/or differing sheet thickness. Different arrangements of slits may include any one or more of different arrangements of rows relative to one another, differently-sized slits, different spacing between slits, different slit shape or slit positioning, such as angular positioning, relative to adjacent slits, etc. The slits 30 may be formed by perforating, such as by cutting, or otherwise weakening the slit-sheet material 22 intermittently across the width of the slit-sheet stock material 22.

The rows 32 of slits 30 generally are parallel to one another and are generally periodically, and typically equally, longitudinally-spaced from one another. The slits 30 are intermittently but periodically dispersed across the rows 32, with the slits 30 of each row 32 generally being staggered in relation to slits 30 of directly adjacent rows 32. Across each row 32 of slits 30, there may be a greater length of combined slits 30 than a length of un-slit portions 34 disposed between laterally-opposed endpoints 36 of each slit 30, providing for an optimum amount of expansion of the slit-sheet stock material 22 when stretched in a direction perpendicular to the slit 30.

The slit-sheet stock material 22 is configured to expand in one or more dimensions. When the slit-sheet stock material 22 is stretched under tension applied in a direction transverse to the direction of the slits 30, typically in a longitudinal feed direction D (FIG. 2), perpendicular to a width dimension of the slit-sheet stock material 22, the length and thickness of the stock material increase, while the lateral width dimension decreases. As a result of the reduced width of the expanded slit-sheet stock material 40 relative to the width of the original slit-sheet stock material 22, the width of the separator sheet 24 typically is less than the width of the unexpanded slit-sheet stock material 22 (see FIG. 2, for example).

The increased thickness as the slit-sheet stock material 22 is stretched longitudinally is caused as least in part by portions of the slit-sheet stock material 22 between the rows of slits 30 rotating relative to the plane of the unexpanded slit-sheet stock material 22. The thickness dimension extends in a normal direction N (FIG. 2) relative to a face of the slit-sheet material 22. The normal direction N is defined as generally orthogonal to the paper's longitudinal length and also generally orthogonal to a lateral extent between laterally-opposed edges 38 of the slit-sheet stock material 22, i.e., the width W. The thickness of the expanded packaging material 40 may be greater than the thickness of the unexpanded slit-sheet stock material 22 by an order of magnitude, or more, when stretched in this manner.

The expanded packaging material 40 has an increased length and thickness and a reduced width as compared to the unexpanded slit-sheet stock material 22. This longitudinal stretching and increase in thickness results in the volumetrically-expanded dunnage product 40. The expansion is effected by the rotation of the un-slit portions 34 between the slits 30 that increases the thickness and by the longitudinal separation of the sheet material on opposing upstream and downstream sides of each slit 30 from each other that increases the length. The increased volume allows the expanded dunnage product 40 to serve as a perforate protective void-fill or protective cushioning material for packaging articles in containers.

Referring back to FIG. 2, the non-die cut separator sheet 24 may be any suitable sheet material such as paper (e.g., kraft paper, tissue paper, etc.), plastic sheets, metal foil, or any other combination thereof. The non-die cut sheet 24 keeps layers of expanded packaging material 40 from nesting, thereby retaining and enhancing the protective cushioning properties of the expanded packaging material 40. Additionally, if the non-die cut sheet 24 were not included in the bound pad 20, a user may have to insert an interleaf sheet, either by unrolling and cutting it, or by taking it from a separate pre-cut stack of interleaf sheets. These scenarios would require extra handling and shelf space at the point-of-use, reducing the utility of the bound pad 20 as a convenient and compact solution.

Figure 6:
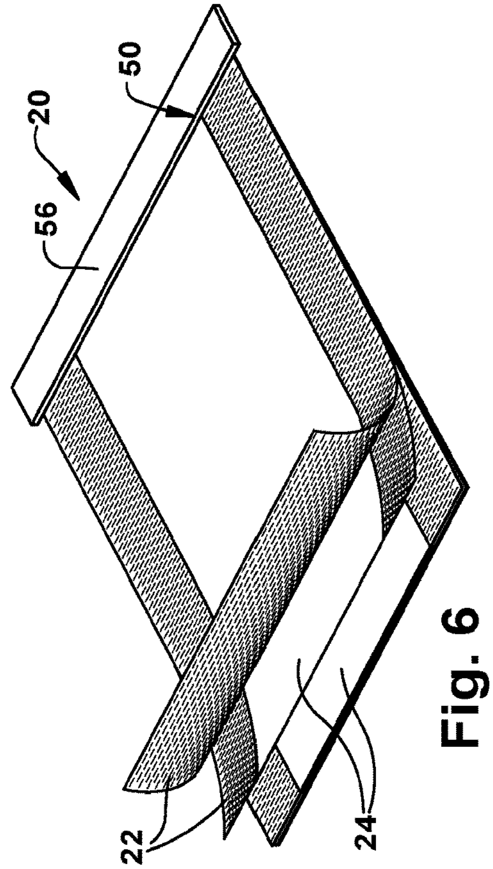
FIG. 6 is another perspective view of the bound pad of FIG. 5.
Figure 5:
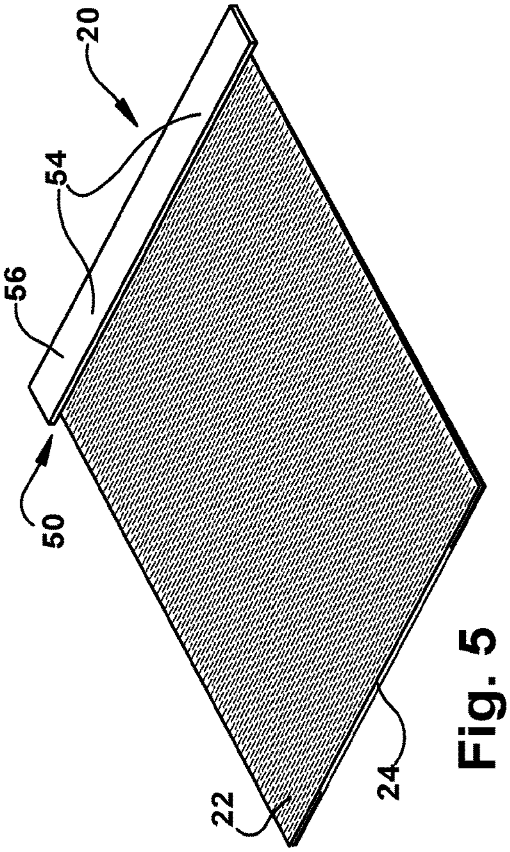
FIG. 5 is a perspective view of the bound pad of the present invention.
Figure 7:
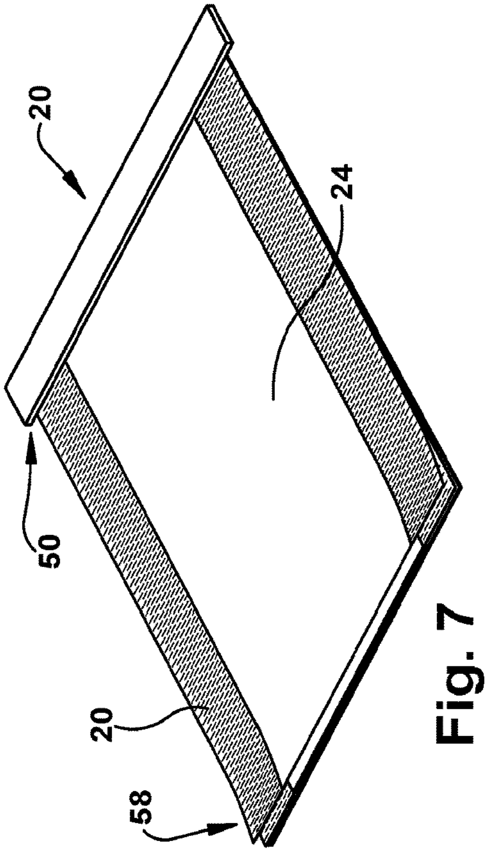
FIGS. 7-14 illustrate the sequential steps of wrapping an article using the bound pad of FIG. 5.

An exemplary bound pad 20 is shown in more detail in FIGS. 5 and 6 and includes sheets of slit-sheet material 22 and non-die cut interleaf sheets 24 bound together adjacent a top edge 50, also referred to as the bound edge 50. The sheets 22, 24 may be bound with tape or other adhesive, such as a hot-melt binding adhesive, or the edge 50 may be mechanically bound by staples, other mechanical clamping elements, or other means for holding the stack of sheets 22, 24 together in the bound pad 20.

As mentioned above, when the slit sheet material 22 is stretched lengthwise to create the expanded packaging material 40, the expanded packaging material 40 has a narrower width than the starting slit sheet material 22 but a greater length and thickness. The illustrated sheets of slit-sheet material 22 and non-die cut separator sheets 24 have equal lengths but unequal widths. The non-die cut separator sheets 24 typically have a width that is approximately the expected width of the expanded packaging material 40. In other embodiments, the sizes of the sheets of slit-sheet material 22 and non-die cut separator sheets 24 may be any combination of matched or mismatched lengths and widths depending upon the size of the article to be wrapped and/or the desired cushioning properties.

The bound pad 20 may be rigidly attached to the tabletop 52 or other structure using screws 54 or other fasteners to hold the bound pad 20 in place such that as the user pulls the slit sheet material 22 away from the bound edge 50, tension in the slit sheet material 22 causes the slits to separate or open, stretching the slit sheet material 22 such that the slit sheet material 22 expands in length and thickness to form the expanded packaging material 40. In another embodiment, the bound pad 20 may include two or more holes adjacent the bound edge 50 to enable the bound pad 20 to be set down over mounting screws, hooks, or other elements configured to resist a pulling force away from those elements. In another embodiment, a bottom layer of the bound pad 20 may be rigid, formed of cardboard or a similar material, for example, such that tension may be provided by positioning a leading edge of the bottom layer against a raised edge that prevents the rigid bottom layer of the bound pad 20 from being pulled over that raised edge, or by sliding the bound pad into a folio, clipboard, or other device designed to hold a pad of writing paper of similar dimensions. The raised edge may be formed by a front of a drawer or a raised restraining strip, for example.

All of the sheets 22 and 24 in the bound pad 20 may be perforated or otherwise weakened along a line adjacent to the bound edge 50 to facilitate removal. The bound pad 20 may include a stiff wooden or cardboard tear strip 56 at the bound edge 50 to further facilitate removing sheets 22 or 24 as desired.

Figure 8:
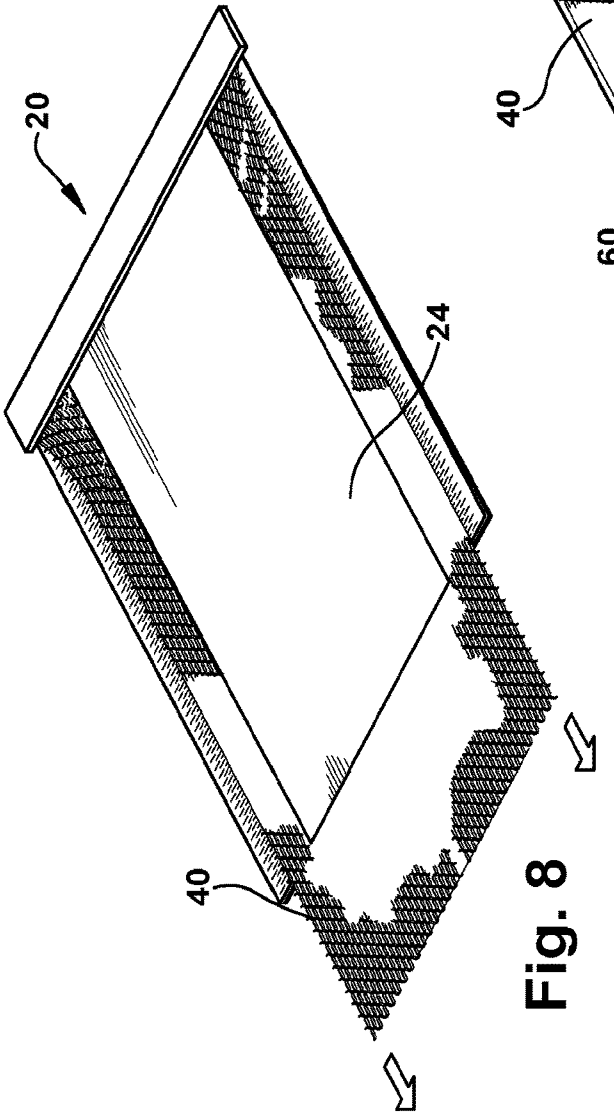

Referring now to FIGS. 7 to 14, an exemplary method of using the bound pad 20 will be described. In the first step of wrapping an article, a user creates tension by pulling a free edge 58 of the sheet of slit-sheet material 22 opposite the bound edge 50, thereby expanding the slit-sheet material 22 to obtain a sheet of expanded slit-sheet packaging material 40 as shown in FIG. 8.

Figure 9:
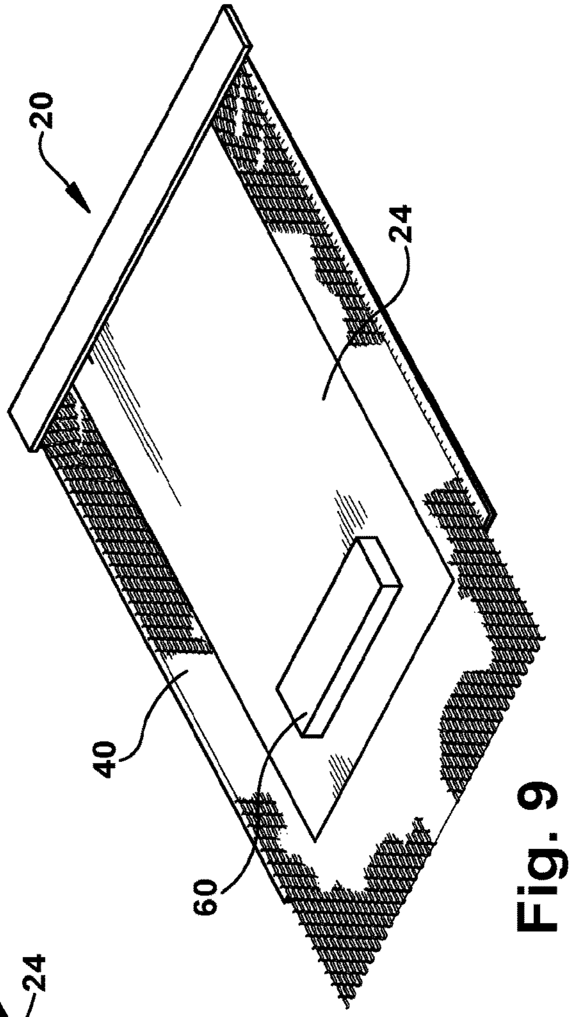
Figure 10:
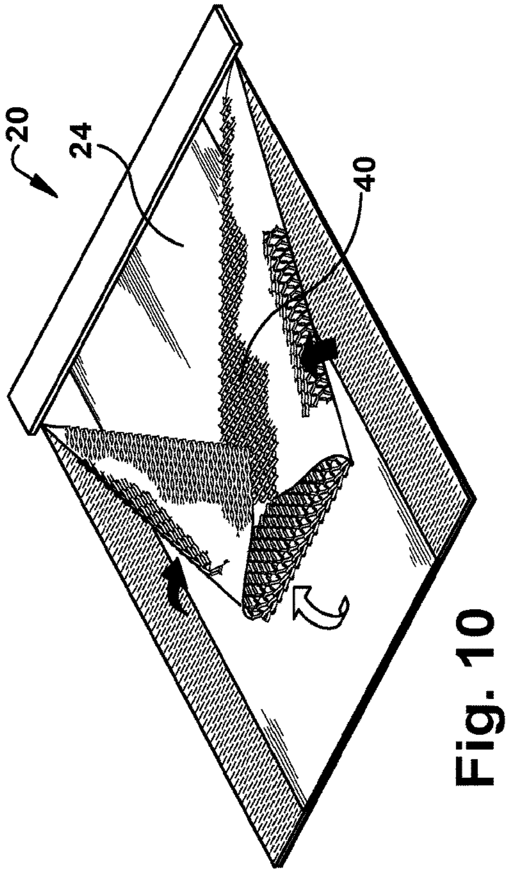
Figure 12:
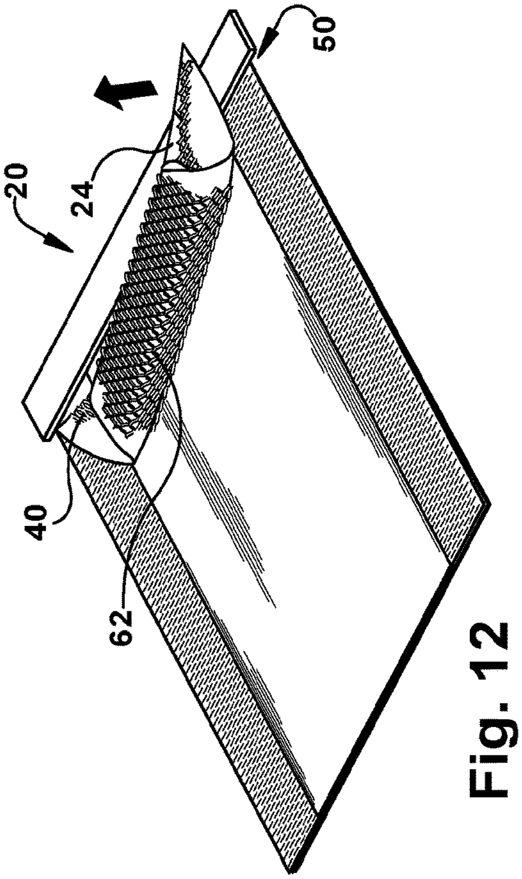
Figure 11:
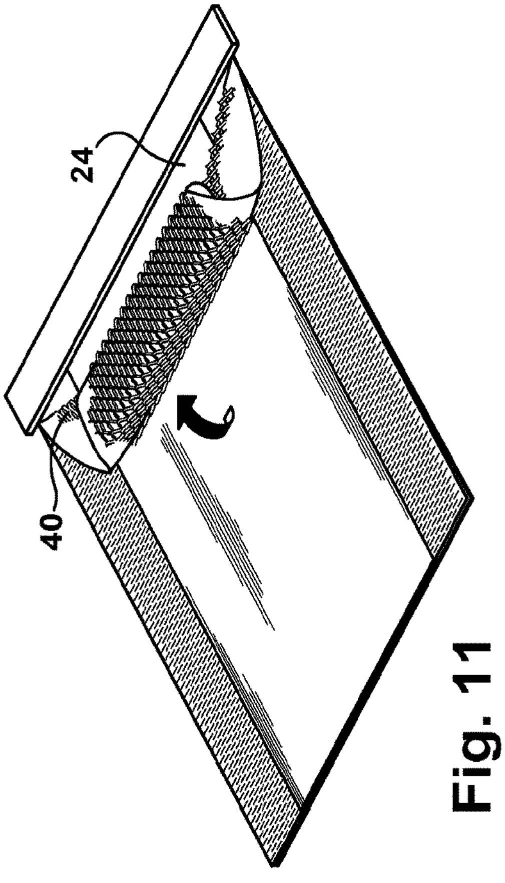
Figure 14:
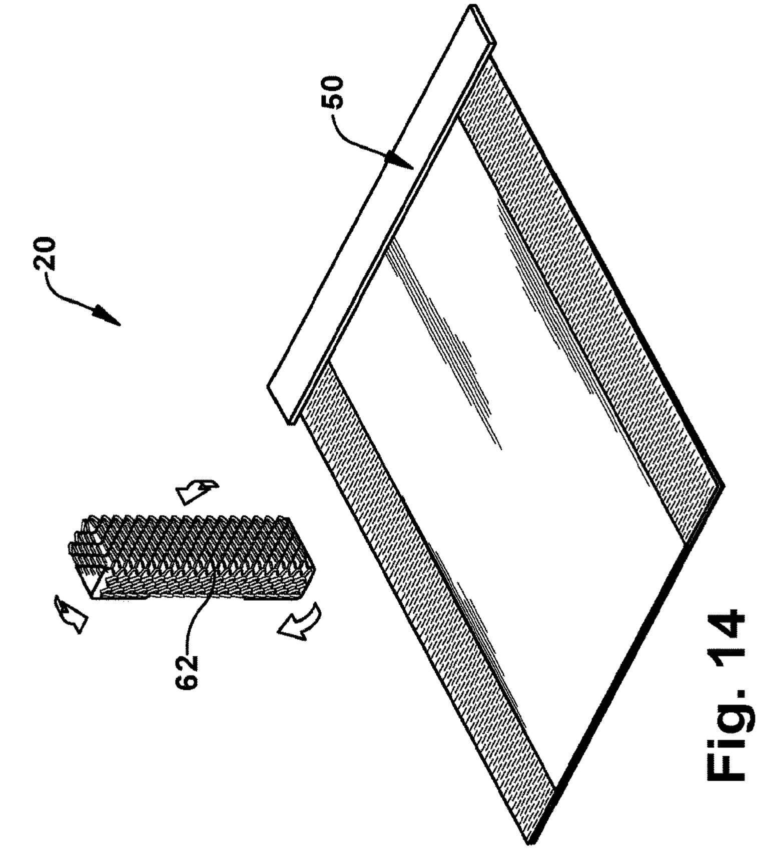
Figure 13:
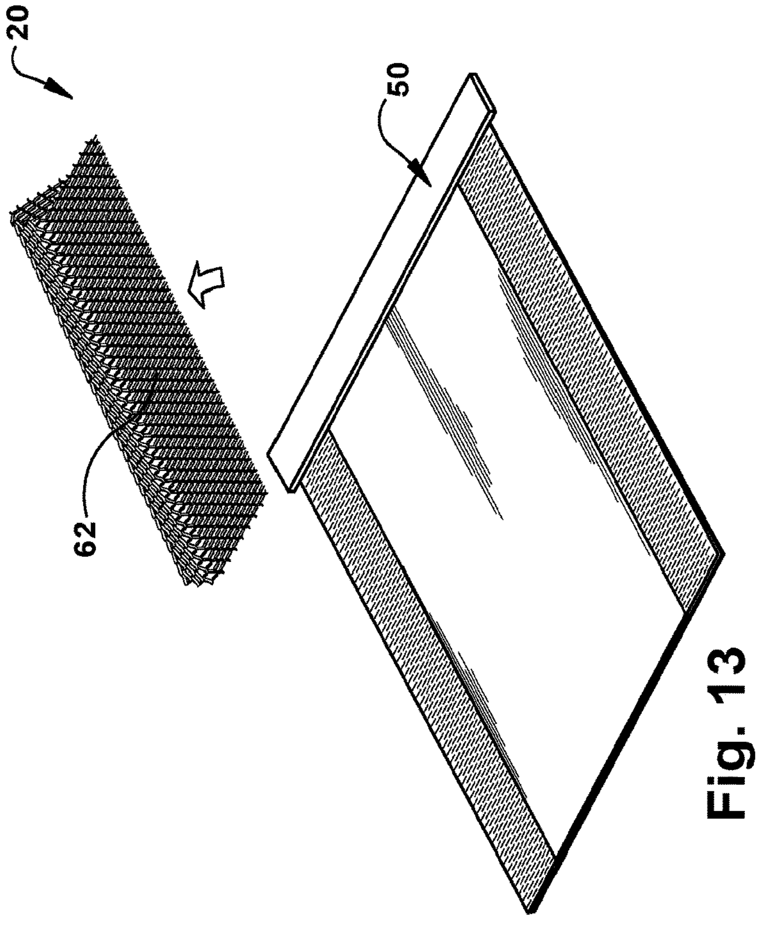

Next, the user places an article 60 on the interleafed non-die cut separator sheet 24 and proceeds to wrap the article 60 within the expanded packaging material 40 and non-die cut separator sheet 24 pair, as shown in FIGS. 9 to 11. Although the separator sheet 24 is on top in the illustrated embodiment, alternatively the separator sheet 24 may be underneath the sheet of expanded packaging material 40.

As the user nears the bound edge 50 of the bound pad 20, the user tears the sheet of expanded slit-sheet material 40 and non-die cut separator sheet 24 adjacent to the bound edge 50 to remove the wrapped article 62 from the bound pad 20. The wrapped article 62 is now ready to be placed in a container, or wrapped in additional layers of combined pairs of expanded slit-sheet material 40 and non-die cut separator sheet 24.

In summary, the present invention provides a bound pad 20 that presents a compact and convenient form of providing a two-ply construction that includes a slit-sheet stock material that may be positioned on or hung from a flat surface at the end-user's site. The bound pad 20 includes sheets of slit-sheet stock material 22 that are interleafed with non-die cut separator sheets 24. The sheets 22 and 24 are bound together adjacent one edge 50, and may be weakened adjacent the bound edge 50 to facilitate their removal from the bound pad during use. A user creates tension by pulling a free edge 58 of the sheet of slit sheet material 22 away from the bound edge 50, thereby expanding the slit material sheet 22 to form an expanded packaging material 40. The user places an article 60 on the bound pad 20, wraps the article 60 in the sheets 24, 40, and tears the sheets 24, 40 to remove the wrapped article 62 from the bound pad 20.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

The invention claimed is:

1. A bound pad comprising a generally rectangular stack of a plurality of sheets of stock material, including a plurality of sheets of slit stock material, with each sheet of slit stock material being separated from an adjacent sheet of slit stock material by an interleafed non-die cut separator sheet, where the sheets of slit stock material each include a plurality of slits configured to separate under tension applied in a direction across the length of the slits, and where the plurality of sheets of the slit stock material and the interleafed non-die cut separator sheets are bound together along one edge, such that the interleafed non-die cut separator sheet is bound to each sheet of the plurality of sheets of slit stock material.

2. The bound pad of claim 1, where the plurality of slits are arranged in a plurality of transversely-extending, longitudinally-spaced rows of slits, where each slit is longitudinally expandable.

3. The bound pad of claim 1, where at least one of the plurality of sheets of slit stock material and the interleafed non-die cut separator sheets is recyclable, biodegradable, and composed of a renewable resource.

4. The bound pad of claim 1, where at least one of the plurality of sheets of slit stock material and interleafed non-die cut separator sheets includes paper.

5. The bound pad of claim 1, where the bound edge is bound with an adhesive.

6. The bound pad of claim 1, where the bound pad is configured for attachment to a structure to provide tension when a user pulls a sheet of slit stock material to cause the slit stock material to expand to form an expanded packaging material.

7. The bound pad of claim 1, further comprising a tear strip adjacent the bound edge to facilitate removal of sheets from the stack.

8. The bound pad of claim 1, where the sheets of slit stock material and the interleafed non-die cut separator sheets are perforated or otherwise weakened adjacent the bound edge to facilitate removal from the stack.

9. The bound pad of claim 1, where the pad is inserted into a folio, clipboard or other device designed to accommodate a pad of conventional writing paper of similar dimensions.

10. A method of using the bound pad of claim 1, comprising the following steps:

pulling an edge of a sheet of the plurality of sheets of slit stock material away from the bound edge, thereby expanding the slit stock material to form a sheet of expanded packaging material;

placing an item to be protected on the stack;

simultaneously wrapping the item within a sheet of expanded packaging material and a non-die cut separator sheet; and tearing the sheet of expanded packaging material and the non-die cut separator sheet adjacent to the bound edge to remove the wrapped item from the bound pad.

11. The method of claim 10, where the placing step includes placing the item on the non-die cut separator sheet.

* * * * *